United States Patent [19]
Goulding

[11] Patent Number: 5,735,227
[45] Date of Patent: Apr. 7, 1998

[54] APPARATUS FOR SEALING RUPTURES

[75] Inventor: Grahame J. Goulding, Bringelly, Australia

[73] Assignee: Environmental Emergency Seals Pty Limited, Wales, Australia

[21] Appl. No.: 417,443

[22] Filed: Apr. 5, 1995

Related U.S. Application Data

[63] Continuation of Ser. No. 129,861, Sep. 30, 1993, abandoned, which is a continuation-in-part of Ser. No. 988,948, Mar. 9, 1993, abandoned.

[30] Foreign Application Priority Data

| Sep. 11, 1990 | [AU] | Australia | PK2253 |
| Dec. 7, 1990 | [AU] | Australia | PK3785 |
| Sep. 11, 1991 | [AU] | Australia | PCT/AU91/00422 |
| Oct. 1, 1992 | [AU] | Australia | PL5071 |

[51] Int. Cl.$^6$ ............................................. B63B 43/16
[52] U.S. Cl. ..................... 114/227; 29/402.09; 29/897.1
[58] Field of Search ................... 29/402.02, 402.09, 29/402.11, 897.1; 114/227, 228, 229; 138/98, 99

[56] References Cited

U.S. PATENT DOCUMENTS

| 2,586,640 | 2/1952 | Furman | 138/99 |
| 2,987,098 | 2/1961 | Daniel . | |
| 3,150,690 | 9/1964 | Danielson et al. | 138/99 |
| 3,857,249 | 12/1974 | Kelly et al. | 114/227 X |
| 4,202,379 | 5/1980 | Vetter | 138/99 |
| 4,527,500 | 7/1985 | Fuerst | 114/229 |
| 5,009,179 | 4/1991 | Johnson | 114/229 |
| 5,036,786 | 8/1991 | Uri | 114/229 |
| 5,038,701 | 8/1991 | Riddell | 114/229 |
| 5,058,519 | 10/1991 | Collins | 114/227 |
| 5,165,356 | 11/1992 | Williams | 114/229 |
| 5,195,446 | 3/1993 | Riddell | 114/229 |
| 5,277,143 | 1/1994 | Frangulea | 114/229 |
| 5,355,824 | 10/1994 | Meyer et al. | 114/229 |

FOREIGN PATENT DOCUMENTS

| 11569/19 | of 1919 | Australia . | |
| 45017/59 | 1/1959 | Australia . | |
| 1055684 | 11/1983 | U.S.S.R. | 114/227 |
| 1615046 | 12/1990 | U.S.S.R. | 114/227 |
| 188561 | 11/1922 | United Kingdom | 114/227 |
| 926668 | 5/1960 | United Kingdom . | |
| 2244680 | 12/1991 | United Kingdom | 114/229 |
| WO 87/02650 | 11/1986 | WIPO . | |

*Primary Examiner*—S. Thomas Hughes
*Attorney, Agent, or Firm*—Nydegger & Associates

[57] ABSTRACT

Apparatus (10) for sealing a rupture (11) in a wall (12) having fluid on one side, the rupture forming petals (13) extending away from the wall. The apparatus is formed by a resilient backing plate (18) for fitting around the rupture, fastening magnets (14) attached to backing plate (18) for attaching the backing plate (18) to the wall (12), a resilient seal, such as an O-ring (19), adjacent the backing plate (18) having an aperture for positioning over the rupture, and a fluid-tight enclosure (20) extending over the aperture in the seal to cover the rupture. The resilient seal (19) is compressed against the wall (12) to substantially seal against any flow of fluid leaking through the rupture when the backing plate (18) is attached to the wall (12).

7 Claims, 1 Drawing Sheet

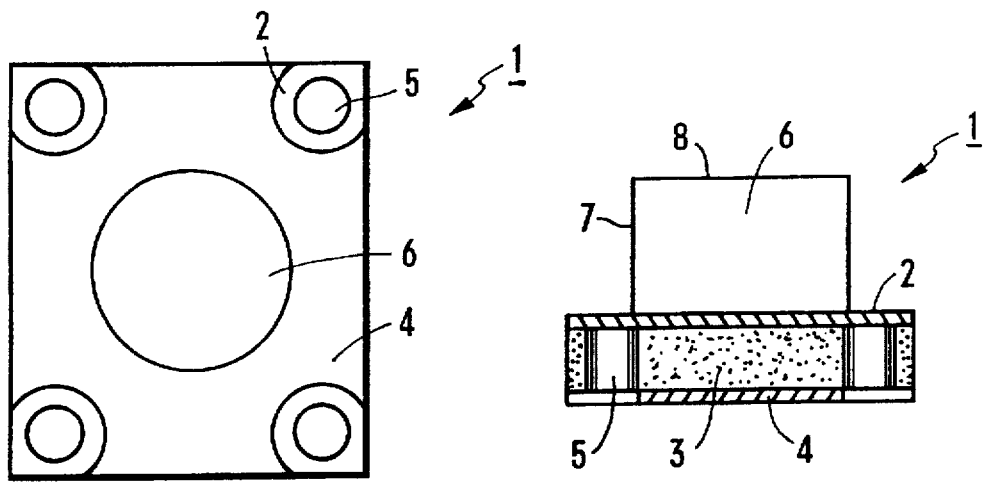
Fig. 1
Fig. 2
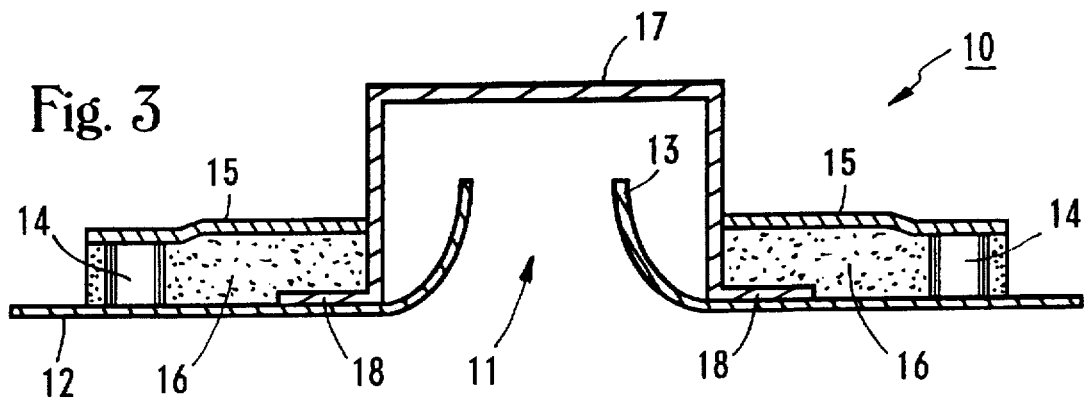
Fig. 3
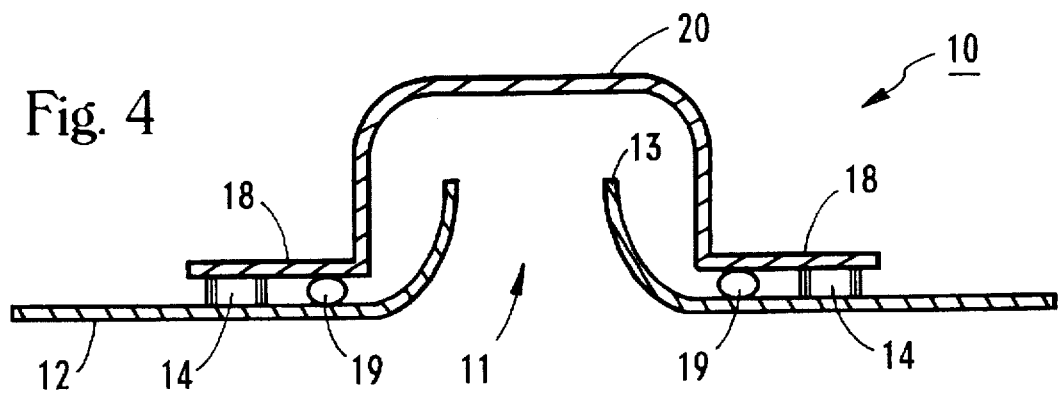
Fig. 4

APPARATUS FOR SEALING RUPTURES

RELATED APPLICATIONS

This is a continuation of application Ser. No. 08/129,861, filed on Sep. 30, 1993, now abandoned, which is a continuation-in-part of Ser. No. 07/988,948, filed on Mar. 9, 1993, now abandoned.

BACKGROUND OF THE INVENTION

This invention relates to a method and apparatus for sealing ruptured leaks and thereby substantially prevent leakage of a fluid through the rupture.

It is a problem to seal leaks in ruptures in fluid containers, such as tanks or pipes, where fluid is leaking through the rupture from the inside of the container to the outside, as the seal must act against the pressure of the fluid.

It is particularly a problem to seal hulls of ships which have ruptured either due to an external explosion or due to a collision. In such cases, the water on the outside of the hull is entering the ship under pressure and any seal must be able to withstand this pressure. Furthermore, the hull is likely to have been damaged in such a way that portions of the hull wall around the rupture are bent inwards, reassembling petals on a flower. Because these "petals" are generally of steel and are very rigid, if they extend directly into the ship and surround the rupture, it is very difficult to obtain access to the rupture from the inside in order to try to seal it.

In PCT patent application No WO92/04574, applied for by the present applicant, an apparatus is described which allows the sealing of ruptures in fluid storage and transport tanks. Although the apparatus is successful in sealing ruptures from the outside against the pressure of the fluid in the tank, it is not particularly suitable for sealing from the inside a rupture having petals of tank material extending inwardly of the tank.

In patent specification WO87/02650, an apparatus is described which includes a vacuum leak sealing pad which uses a vacuum to secure the pad to a tank wall. However, such an apparatus is also cumbersome and difficult to use.

BRIEF SUMMARY OF THE INVENTION

It is an object of the present invention to provide an apparatus and method of sealing ruptures which substantially overcomes or ameliorates the abovementioned disadvantages.

According to one aspect of the present invention there is disclosed apparatus for substantially sealing a rupture in a wall which may have fluid on one side thereof, the apparatus comprising a resilient backing plate for fitting around the rupture, fastening means attached to the backing plate for attaching the backing plate to said wall, a resilient seal adjacent the backing plate having an aperture for positioning over the rupture, and fluid-tight means extending from the the backing plate adjacent the resilient seal over the aperture in the seal to cover the rupture, wherein said resilient seal is compressed against the wall to substantially seal against any flow of fluid leaking through the rupture when the backing plate is attached to the wall.

It will be apparent that the fluid-tight means can be integral with the backing plate or could be of separate material therefrom.

In one embodiment of the invention, the rupture has petals of wall material extending out of the plane of the wall and the fluid tight means extends from the backing plate out of the plane of the backing plate for sealing around the rupture.

In one preferred embodiment, the backing plate and the resilient seal are substantially annular having a central aperture for fitting over the petals defining the rupture. By annular is meant that there is a generally central aperture surrounded by a border of material. The shape of the border and aperture is immaterial. Although they could be circular, they could alternatively be of any desired shape. Furthermore, the aperture need not be of the same shape as the border.

In one embodiment, the fluid-tight means comprises a rigid container having an open end sealed to the resilient seal. The rigid container is conveniently cylindrical and is sealed over the apertures in the backing plate and resilient seal.

In a second embodiment, the fluid-tight means comprises a rigid, but substantially flexible sheet, which can be deformed to cover the rupture and any petals thereof.

The fluid-tight means can be integral with the backing plate, which can be rigid or rigid, but flexible.

In a further preferred embodiment, the fastening means comprises at least one contact face for attachment to the comprises wall. Preferably the contact face(s) is/are nearer the backing plate than a contact surface of the resilient seal, whereby the resilient seal is compressed between the backing plate and the wall when the contact face(s) is/are brought into contact with the wall. Preferably, a plurality of similar fastening means are provided at spaced intervals along the periphery of the backing plate.

Preferably, the resilient seal is, or includes a layer, of material which is impervious to the fluid passing through the rupture.

The resilient seal can be a toroidal member, such as an O-ring, or can be a compressible layer. The compressible layer is preferably formed of sponge rubber, plastics material, such as polyurethane, a quasi-plastics material of the type that liquifies when under pressure but then solidifies again, such as Sorbothane, or any other suitable material. The compressible layer can, for example comprise a bladder filled with gas, e.g. air, liquid or material which solidifies in the bladder, and the bladder is preferably partly inflated or filled before being applied to the wall with the amount of inflation being varied, usually increased, after application to the tank.

Another preferred feature is that the fastening means comprises magnetic means when the wall is made of steel, and suction means when the wall is made of a non-ferrous material. The magnetic means can be of any type, for example metallic, ceramic, rare-earth or electro- magnets. The suction means is preferably of the suction cap type, but other types of vaccuum fastening means could be used. In some cases, an adhesive could be used as the fastening means. For example, some pressure, or impact, adhesives will displace fluid from the contact area if applied quickly.

Another preferred feature is that the backing plate can be constructed of a flexible material having corrugations to provide strength to the plate when the plate is of a large size.

The flexible backing plate can be of any suitable flexible, rigid material, for example, aluminium, stainless steel or various types of plastics or rubber compounds.

According to a second aspect of the present invention, there is provided a method of sealing a rupture in a wall which may have fluid on one side thereof, the method comprising the steps of applying to said wall over the rupture an apparatus comprising a resilient backing plate for fitting around the rupture, fastening means attached to the backing plate for attaching the backing plate to said wall, a resilient seal adjacent the backing plate having an aperture for positioning over the rupture, and fluid-tight means extending from the the backing plate adjacent the resilient seal over the aperture in the seal to cover the rupture, wherein said resilient seal is compressed against the wall to substantially seal against any flow of fluid leaking through the rupture when the backing plate is attached to the wall.

Preferably, the backing plate has an aperture therein for fitting over petals formed of wall material defining the rupture, the resilient seal having an aperture corresponding to the aperture in the backing plate for positioning over the petals defining the rupture.

The fluid-tight means is preferably sealed to the resilient seal and extends through the periphery of the aperture in the backing plate out of the plane of the resilient seal for sealing around the rupture.

BRIEF DESCRIPTION OF THE DRAWINGS

Embodiments of the present invention will now be described, by way of example, with reference to the drawings, in which:

FIG. 1 shows an underside plan view of a first embodiment of an apparatus according to the present invention;

FIG. 2 shows a side view of the apparatus of FIG. 1;

FIG. 3 shows a cross-sectional view through a second embodiment of an apparatus according to the invention in position over a rupture; and FIG. 4 shows a view similar to that of FIG. 3, but of a third embodiment of the invention.

DETAILED DESCRIPTION OF THE DRAWINGS

There is shown in FIGS. 1 and 2 a first embodiment of an apparatus 1 according to the invention. The apparatus 1 includes an aluminium plate 2 onto which a sponge rubber layer 3 is bonded. The sponge rubber layer has an impervious skin 4 which is impervious to the fluids which might leak through a rupture in a wall (not illustrated). In the case of a rupture to the wall of a ship, the layer 4 should be impervious to water. Naturally, if the sponge rubber is itself impervious to water, a separate impervious layer is not required.

Shown at the periphery of the plate 2 are a set of four permanent magnets 5 which are also bonded to the aluminium plate. The sponge rubber layer 3 and the impervious skin 4 are both cut out around each of the magnets 5 to allow the magnets to contact the wall, when applied thereto. As seen in FIG. 2, the height of the permanent magnets 5 is slightly less than that of the sponge rubber layer 3 when the apparatus 1 is not in use.

As also shown in FIGS. 1 and 2, the apparatus 1 is further provided with a hollow compartment 6 extending from the backing plate 2 and open via an aperture in the backing plate 2 and corresponding apertures in the resilient layer 3 and the impervious layer 4 to the underside of the apparatus 1. The hollow compartment 6 comprises a cylindrical wall 7 and a top portion 8 and is sealed to the impervious layer 4, or to the resilient layer 3, if there is no impervious layer, so that any fluid passing through the apertures in the layers 3 and 4 and the plate 2 are constrained within the compartment 6.

When a rupture occurs, for example due to a shell, torpedo, mine or other explosive, in a wall of a ship or other vessel made of steel or other ferrous material the apparatus 1 is able to be used to stem the flow of water through the rupture. The permanent magnets are fastened to the steel wall and the sponge rubber layer 3 is slightly compressed to thereby substantially seal the rupture. The flexible nature of the aluminium plate 2 allows the apparatus to be bent according to the shape of the wall where the rupture occurred. Any portions of the wall around the rupture bent inwardly by the explosion to form "petals" extending into the hull of the ship will pass through the apertures in the resilient and impervious layers and the backing plate and extend into the compartment 6. Thus, the rupture can still be sealed easily.

Apparatus 10 according to a second embodiment of the invention is shown in FIG. 3 in position sealing a rupture 11 in a wall 12 of a ship. The rupture 11 is such that petals 13 of the wall 12 extend inwardly of the ship and are both sharp and rigid. The apparatus 10 is generally larger than that shown in FIGS. 1 and 2 and has a circular plan shape with a number of permanent magnets 14 arranged about the periphery thereof so as to attach the apparatus 10 to the wall 12 with sufficient force to seal it thereto against the pressure of water entering through the rupture 11. The magnets 14 are attached to a backing plate 15, similar to the backing plate of the first embodiment, to which is attached a resilient layer 16 similarly to the first embodiment. A compartment 17 of sufficient size to enclose the petals 13 is arranged in the centre of the apparatus 10 open to the side facing the wall 12. The compartment 17 is preferably integrally made so as to be completely watertight and includes flanges 18 which extend partly along the underside of the resilient layer for extra strength.

As can be seen, when the apparatus 10 is placed over the rupture 11, the petals 13 are enclosed in the compartment 17 and the annular resilient layer 16 and backing plate 15 extend around the periphery of the rupture 11. The magnets 14 are attached to the wall 12 causing the resilient layer, which in this embodiment is itself waterproof, to comprises against the wall 12 and thus seal the rupture 11.

Shown in FIG. 4 is a further embodiment of the invention in which identical elements to those of FIG. 3 have identical reference numerals. Thus, as can be seen, the compartment flanges 18 now have the magnets 14 attached to their lower surfaces. Sealing is provided by an O-ring 19 arranged between the flanges 18 and the wall 12. The O-ring 19 has a thickness slightly larger than the height of the magnets 14 so that, when the magnets contact the wall 12, the O-ring 19 is compressed to produce a seal. In this embodiment, also, the flanges 18, forming the backing plate, have sealed to their inner perimeter a rigid, but flexible sheet 20 of fluid tight material. The sheet 20 could be of plastics or rubber material, or could be of metal. It will be apparent, however, that the sheet is sufficiently flexible that it can be deformed over the petals.

It will be apparent that although only particular embodiments of the invention have been disclosed, various modifications, changes or improvements could be made without departing from the scope of the present invention. For example, although the compartment has been described as being generally cylindrical, it will be apparent that any shape could be used. Furthermore, any shape could be used for the backing plate and resilient layer around the compartment. There could, for example be provided a number of such sealing apparatus in different shapes and sizes to cope with ruptures of different shapes and sizes.

Also, although the compartment has been described as being rigid, but flexible material, it could be formed, if desired, of flexible material, such as plastics material in the form of a bag, whose opening is sealed to the resilient layer and which fills with the fluid passing through the rupture so as to enclose the petals. Of course, the flexible material must be impervious to the fluid and sufficiently strong so as to withstand the fluid pressure as well as not being easily ruptured itself by the edges of the petals. The advantages of using flexible material, however, are that such an apparatus takes up much less storage space and that different size compartments can easily be made simply by replacing the bag by a different size one.

What I claim is:

1. An apparatus for substantially sealing a rupture in a wall which may have fluid on one side, said apparatus comprising:

a deformable backing plate to substantially conform to the contour of the wall, said backing plate being sized and shaped to surround the rupture being sealed;

a resilient compressible seal fixed to a major surface of said backing plate, said seal having a seal surface sized and shaped to sealingly contact the wall surrounding the rupture to at least substantially seal the rupture when the resilient compressible seal is compressed against the wall, said seal having a plurality of apertures extending to said seal surface;

a plurality of magnets fixed to said backing plate, said magnets being arranged in a pattern to surround the rupture, each of said magnets having a face to magnetically engage the wall for magnetic attachment of said apparatus to the wall; and wherein said magnets are each aligned with a respective one of the apertures so that when seal is in an uncompressed condition before attachment of said apparatus to the wall, said surface extends beyond said faces of said magnets; and when said apparatus is magnetically attached to the wall by magnetic engagement of the faces with wall, said backing plate is urged toward the wall by said magnets, to sealingly compress said seal between said backing plate and the wall until said seal surface is generally coplanar with said exposed magnet faces.

2. The apparatus of claim 1, wherein said resilient seal is a resilient layer.

3. The apparatus of claim 2, wherein said resilient layer has a first major surface fixed to said backing plate, and a second major surface providing said seal surface, with said second major surface being provided with an impervious skin.

4. The apparatus of claim 1, wherein said resilient seal is an elongated seal member of a loop configuration to encompass an area to substantially sealingly close the rupture.

5. The apparatus of claim 4, wherein said seal element is of a circular configuration so as to surround the rupture.

6. The apparatus of claim 1, wherein said backing plate has a portion extending away from said major surface to accommodate portions of the wall adjacent the rupture which wall portions project from the general plane of the wall, and said resilient seal has an aperture cooperating with said backing plate portion to permit the wall portions to project into said backing plate portion.

7. The apparatus of claim 6, wherein said backing plate portion is formed separate from the remainder of said backing plate but is fixed thereto.

* * * * *